United States Patent
Cohen et al.

(10) Patent No.: US 6,701,451 B1
(45) Date of Patent: Mar. 2, 2004

(54) SELECTIVE CORRECTION OF DATA ERRORS

(75) Inventors: Aviram Cohen, Lexington, MA (US); Ishai Kedem, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 437 days.

(21) Appl. No.: 09/637,615

(22) Filed: Aug. 11, 2000

(51) Int. Cl.[7] .............................................. G06F 11/00
(52) U.S. Cl. ........................ 714/5; 714/6; 714/42; 714/54
(58) Field of Search ...................... 714/5, 48, 6, 42, 714/54, 723, 718; 711/114

(56) References Cited

U.S. PATENT DOCUMENTS

| | | | | |
|---|---|---|---|---|
| 4,535,455 A | * | 8/1985 | Peterson | 714/6 |
| 5,479,611 A | * | 12/1995 | Oyama | 714/48 |
| 5,528,755 A | * | 6/1996 | Beardsley et al. | 714/48 |
| 5,768,502 A | * | 6/1998 | Ikushima et al. | 714/54 |
| 5,774,647 A | * | 6/1998 | Raynham et al. | 714/48 |
| 5,848,077 A | * | 12/1998 | Kamae et al. | 714/807 |
| 5,935,260 A | * | 8/1999 | Ofer | 714/42 |
| 5,958,066 A | * | 9/1999 | Kedem | 714/5 |
| 6,047,353 A | * | 4/2000 | Vishlitzky et al. | 711/111 |
| 6,158,025 A | * | 12/2000 | Brisse et al. | 714/48 |
| 6,412,083 B1 | * | 6/2002 | Rothberg et al. | 714/42 |
| 6,446,058 B1 | * | 9/2002 | Brown | 706/60 |
| 2002/0194552 A1 | * | 12/2002 | Sassa et al. | 714/54 |

OTHER PUBLICATIONS

Cowhart, Robert. Mastering Windows 98. Sybex. 2nd Edition. 1–8.*

* cited by examiner

*Primary Examiner*—Robert Beausoliel
*Assistant Examiner*—Yolanda L Wilson
(74) *Attorney, Agent, or Firm*—Fish & Richardson P.C.

(57) ABSTRACT

A method for scanning a mass-storage device in communication with a global memory includes allocating a scan buffer in the global memory for placement of information descriptive of any errors found during the scan. When a scanning utility identifies a data error on the mass-storage device, it writes structured information descriptive of the error to the scan buffer. This information is available to an error-correction utility. The error-correction utility uses this information to determine, with a minimum of human intervention, which data errors to repair and which to ignore.

16 Claims, 3 Drawing Sheets

SELECTIVE CORRECTION OF DATA ERRORS

This invention relates to enterprise-wide data storage systems, and in particular, to methods and systems for selectively correcting errors in data stored in such a system.

BACKGROUND

When we store data on a disk, we often take it for granted that we will one day be able to recover that identical data from the disk. In reality, there are many errors made in storing data on a disk. Fortunately, modern data storage systems provide error-management utilities for largely eliminating the undesirable effects of these data errors. These error-management utilities include both scanning utilities that periodically scan the disk for data errors, and error-correction utilities that repair errors identified by the scanning utilities.

The error-management utilities operate unobtrusively in the background. Periodically, the scanning utility scans the entire disk for data errors. When the scanning utility identifies a data error, it writes information descriptive of that data error to an output device, such as the printer or a monitor. This information takes the form of an unstructured stream of text.

It is not the case that every data error identified by the scanning utility will be repaired by an error-correction utility. In some cases, a data error is so severe that it cannot be repaired at all. In other cases, repair of a particular data error can result in other, more serious errors. Thus, an error-correction utility generally does not blindly repair all disk errors identified by a scanning utility. Instead, there is typically a filtering step in which the error-correction utility is made to repair only selected data errors. This filtering step is performed by a human operator who monitors the data errors as they are listed at the output device and compiles a list of those data errors that are to be repaired.

Once the scan is complete, the human operator executes the error-correction utility. For each data error on the list of data errors to be repaired, the operator executes the error-correction utility. In doing so, the operator provides the error-correction utility with an argument list that causes the error-correction utility to repair that particular error.

The foregoing method is practicable when the number of errors is relatively small. However, as data storage systems have become progressively larger, the number of data errors encountered during a disk scan has likewise become proportionately larger. As a result, it has become increasingly difficult for a human operator to digest a list of data errors and to prepare instructions for an error-correction utility within the time constraints required for reliable operation of the data storage system.

As data storage systems continue to grow in their storage capacity, it is foreseeable that a human operator will no longer be able to even complete execution of the error-correction utility for a particular scan before it is time to begin the next scan.

SUMMARY

The invention provides a method of scanning a mass-storage device in a manner that makes information obtained during that scan directly available to an error-correction utility. This enables the error-correction utility to directly determine, with a minimum of human intervention, whether to repair particular data errors.

In a system incorporating the invention, a system scan buffer is allocated in a global memory in data communication with a mass-storage device. The mass-storage device is then scanned by a scanning utility. As the scanning utility performs the scan, it detects data errors in the mass-storage device. When it does so, it writes information descriptive of those data errors to the scan buffer. This information is thus available for later access by an error-correction utility or by a human operator.

The information written to the scan buffer can include an error code indicative of a type of data error. This is useful because it enables an error-correction utility to automatically determine whether or not the data error is of the type that it ought to repair.

The information written to the scan buffer can also include a status flag indicative of whether the data error has been repaired or a repair flag indicative of whether the data error is to be repaired. The status flag enables the data error to remain in the scan buffer even though it may have already been repaired. The repair flag provides a mechanism for allowing a human operator to override decisions made by an error-correction utility.

Because certain error-correction utilities are only capable of repairing data errors identified by particular scanning utilities, each entry in the scan buffer can also include a signature identifying the scanning utility that detected the data error.

An error-correction utility functions more effectively when it knows where the data error occurred. To provide this information, each entry in the scan buffer can also include an address code indicative of a logical location of the data error in the mass storage medium.

In some data storage systems, a plurality of mass-storage devices is in communication with the global memory. For such systems, information from the various mass-storage devices can be interleaved in the scan buffer. In this case, the scan buffer includes information descriptive of a data error includes information identifying the mass-storage device in which the data error occurred.

The invention also encompasses a method of repairing a data error in a mass storage system having a global memory in communication with at least one mass-storage device. In this method, an error-correction utility retrieves information descriptive of the data error from a scan buffer in global memory. On the basis of this information, the error-correction utility determines whether the data error is to be repaired. If the data error is to be repaired, the error-correction utility attends to the repair. Otherwise, the error-correction utility proceeds to obtain information about other data errors, if any, in the mass-storage device.

The error-correction utility can implement a programmed rule for deciding, on the basis of the information descriptive of the data error, whether the data error is to be repaired. Such information is preferably embodied in the form of a flag. Alternatively, the information descriptive of the data error can be displayed to a system operator. The system operator then makes a manual determination of whether or not that data error is to be repaired. If it is, the system operator alters the entry corresponding to that data error so that the error-correction utility will recognize that that data error is to be repaired.

The invention also includes within its scope a data storage system having a mass-storage device and a global memory in data communication with the mass-storage device. The global memory contains a scan buffer containing information descriptive of data errors in the mass-storage device.

Typically, the information is organized in the scan buffer into a sequence of error entries, each one of which corresponds to a data error. The individual error entries are divided into fields that contain information used by an error-correction utility for deciding whether or not the particular data error associated with that error entry is to be repaired.

The error entry is structured to contain one or more fields containing particular types of information. These fields can include an error-class field containing information indicative of a type of data error, a status-flag field containing information indicative of whether the data error has been repaired, a repair-flag field containing information indicative of whether the data error is to be repaired, a signature field containing information identifying the scanning utility that detected the data error, a time-stamp field containing information indicative of when the data error was recorded in the buffer, and an address field containing a logical location of the data error in the mass storage medium.

These and other features of the invention will be apparent from the following detailed description and the accompanying figures, in which:

DETAILED DESCRIPTION

Figure 1:
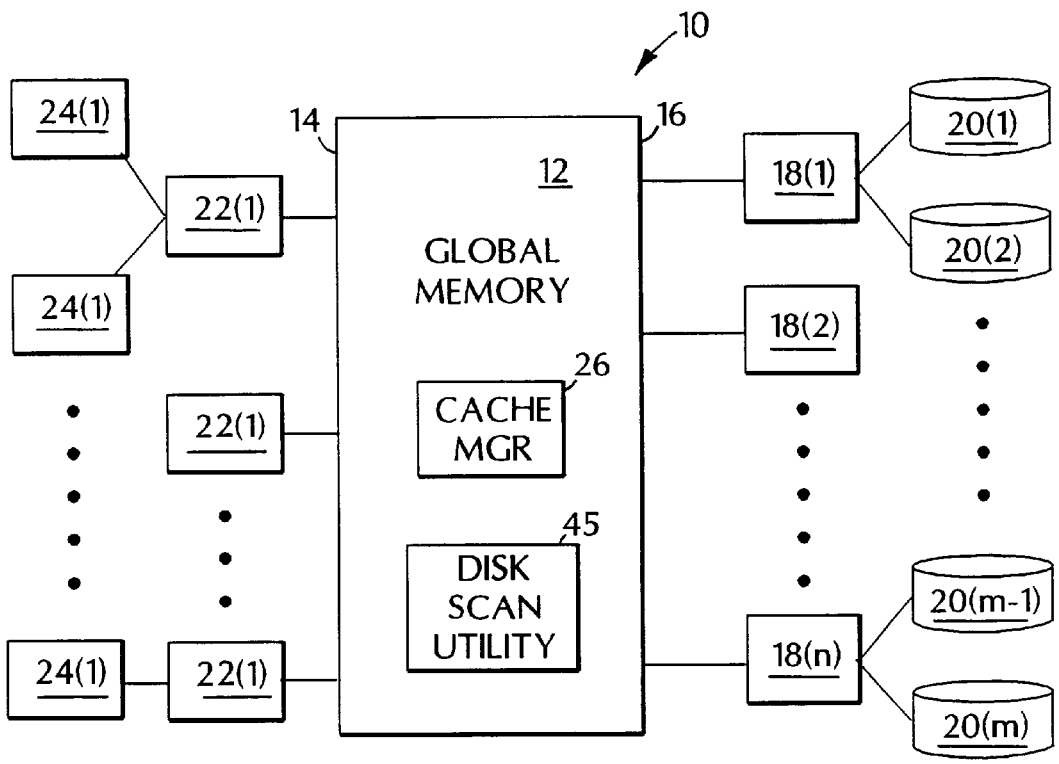
FIG. 1 is a schematic illustration of a data storage system incorporating the principles of the invention.

FIG. 1 shows a disk storage system 10 for practice of a disk scanning method according to the invention. The disk storage system 10 includes a global memory 12 having a front-end 14 and a back end 16. At its back end 16, the global memory 12 is in data communication with a plurality of device controllers 18(1)–18(n), each of which controls a plurality of storage devices 20(1)–20(m). At its front end 14, the global memory 12 is in data communication with a plurality of host adaptors 22(1)–22(i), each of which is in data communication with a plurality of hosts 24(1)–24(j).

The host adaptors 22(1)–22(i) generate instructions for communicating data between the global memory 12 and the individual hosts 24(1)–24(j). Similarly, the device controllers 18(1)–18(n) generate instructions for communicating data between the global memory 12 and the individual storage devices 20(1)–20(m). Both the host adaptors 22(1)–22(i) and the device controllers 18(1)–18(n) are fully described in commonly owned U.S. Pat. No. 5,335,352 entitled "Reconfigurable Multi-Function Disk Controller," which is hereby incorporated by reference.

The storage devices 20(1)–20(m) are typically disk storage devices that include arrays of magnetic disk drives. However, depending on the requirements of the system's users, other mass-storage devices such as tape drives or optical disks can be used in place of some or all of the disk storage devices.

The global memory 12 is typically a high-speed semiconductor memory for temporary storage of data that has been read from, or will ultimately be written to, at least one of the storage devices 20(1)–20(m). The transfer of data into and out of the global memory 12, and the allocation of global memory 12 among the storage devices 20(1)–20(m), is under the control of a cache manager 26. Although shown in FIG. 1 as being resident in global memory 12, the cache manager 26 is a virtual entity that can be resident elsewhere in the data storage system 10 or distributed among various components of the data storage system 10.

The interposition of a global memory 12 between the storage devices 20(1)–20(m) and a host 24(1) improves system throughput by largely eliminating the host's lengthy wait for disk access. From the host's point of view, the global memory 12 appears as a single logical disk with extremely low latency. In reality, the latency has still occurred, but it is borne by the cache manager 26 rather than by the host 24(1). The fact that the cache manager 26 later relays data from the global memory 12 to one or more storage devices 20(1)–20(m), or that the cache manager 26 pre-fetches data from those storage devices, is invisible to the host 24(1).

Figure 2:
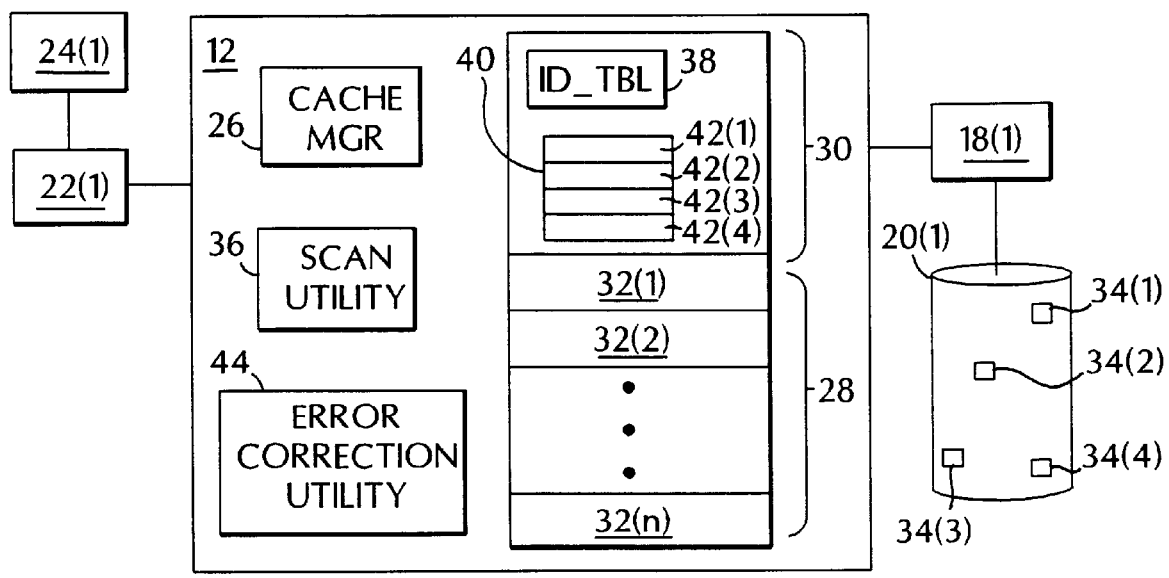
FIG. 2 is a schematic illustration of the architecture of the global memory shown in FIG. 1.

As shown in FIG. 2, global memory 12 includes a data storage section 28 and a control section 30. The data storage section 28 in turn is divided into a plurality of cache slots 32(1)–32(n), with each cache slot corresponding to one of the device controllers 18(1)–18(n) and representing a track accessible to that device controller. A particular device controller 18(1) accesses only its own corresponding cache slot 32(1) and not the cache slots 32(2)–32(n) associated with other device controllers 18(2)–18(n).

In a data storage system 10 as shown in FIGS. 1 and 2, occasional data errors can occur in the storage of data on a storage device 20(1). These data errors are associated with specific locations 34(1)–(n) on the device 20(1). Therefore, as part of routine system maintenance, it is important to periodically scan the entire storage device 20(1) to identify and classify any errors that may exist. This function is performed by a scanning utility 36 that examines each record on a storage device 20(1) to determine whether data associated with that record is consistent with entries in an ID_table 38 stored in the control section 30 of the global memory 12. An example of such a scanning utility 36 is described in connection with a U.S. Patent Application entitled "Error Detection in Disk-Storage Systems," filed on Jul. 20, 2000 and identified by U.S. application Ser. No. 09/620,013, the contents of which are herein incorporated by reference.

The control section 30 also includes a scan buffer 40 for holding information describing any data errors identified by the scanning utility 36. The scan buffer 40 includes error entries 42(1)–(4) corresponding to each of the errors 34(1)–(4) in the storage device 20(1). The scan buffer can be partitioned so that each storage device 20(1)–20(m) has its own section of the scan buffer 40. Alternatively, error entries corresponding to different devices can be interleaved within the scan buffer 40. In such a case, the error entries 42(1)–(4) can include, as part of each entry, information identifying the storage device associated with that entry.

Figure 3:
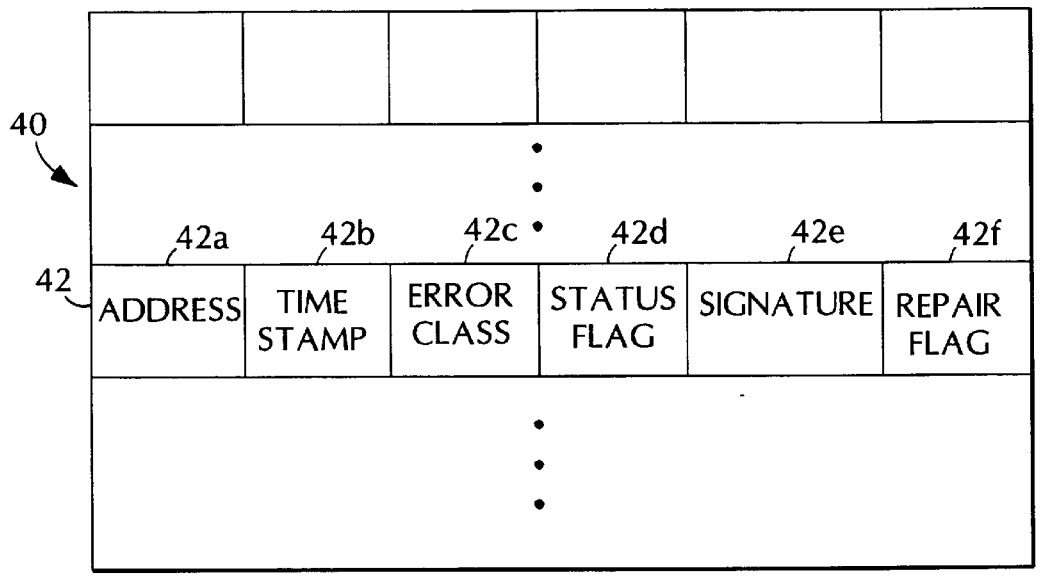
FIG. 3 is a representative data structure of the scan buffer of FIG. 2.

When the scanning utility 36 encounters a data error, it adds an error entry 42 to the scan buffer 40. As shown in FIG. 3, this error entry 42, which corresponds to the error encountered by the scanning utility 36, includes an address field 42a that contains logical coordinates identifying the location of the error. When the storage device is a disk drive, for example, the logical coordinates include the head and cylinder associated with an erroneous track on a disk within the drive. In addition, the scanning utility 36 notes the date and time the data error was identified. This information is saved in a time-stamp field 42b that forms a part of the error entry 42.

The scanning utility 36 also identifies the nature of the data error and includes that information in an error-class field 42c that forms part of the error entry 42. The error-class field 42c is useful because certain types of data error may not be easily repairable by known error correction algorithms without jeopardizing the integrity of other system components. In addition, the statistical distribution of error types can be useful in identifying specific system components that may be prone to failure.

The error entry 42 also includes a status flag 42d that indicates whether or not the data error corresponding to that error entry 42 has been repaired. This status flag 42d is initially set by the scanning utility 36 to indicate that the data error has not been repaired.

Figure 4:
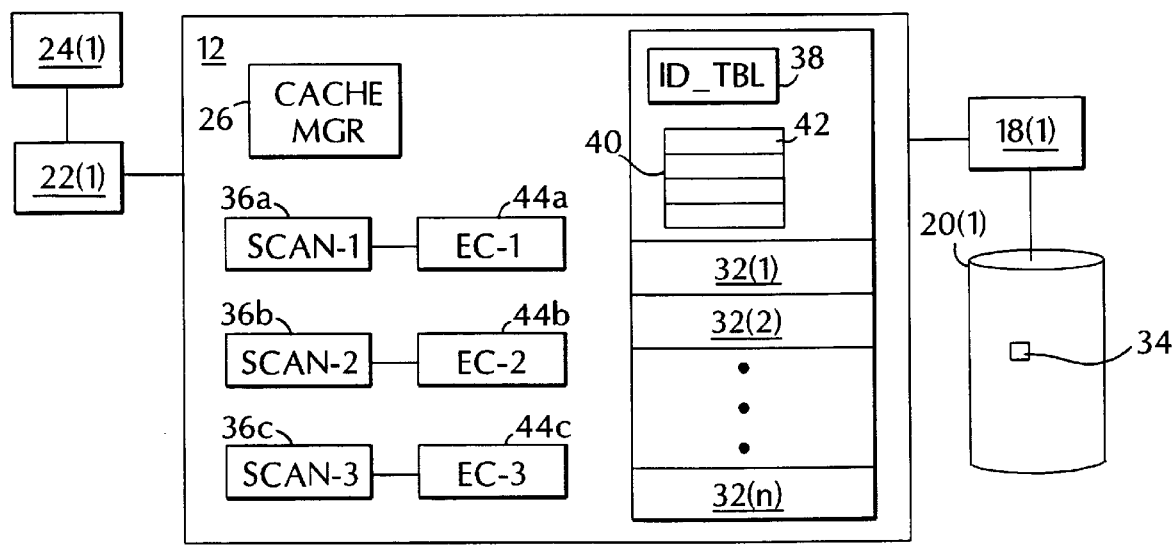
FIG. 4 shows the architecture of the global memory in FIG. 2 with several matching pairs of scanning utilities and error-correction utilities.

As shown in FIG. 4, there may be a plurality of scanning utilities 36a–c available for scanning the storage device 20(1), with each of the scanning utilities 36a–c being optimized for a particular purpose. When this is the case, the scanning utilities 36a–c have matching error-correction utilities 44a–c. An error-correction utility 44a can repair data errors identified by its matching scanning utility 36a but generally not data errors found by a different scanning utility 36b. As a result, the error entry 42 preferably includes a signature field 42e to identify the particular scanning utility that created the error entry 42.

Following the completion of at least a portion of the disk scan by the scanning utility 36, an error-correction utility 44 inspects the scan buffer 40 to identify which errors to correct. In one embodiment, the error-correction utility 44 inspects each error entry 42 for which: (1) the status-flag field 42d indicates that the data error has not been repaired; and (2) the signature field 42e indicates that the data error was identified by a scan utility matched with the error-correction utility 44. On the basis of other information contained in the error entry 42, the error-correction utility 44 automatically decides whether to repair that error.

For example, the error-correction utility 44 can be programmed to repair only specific types of errors. In this case, the error-correction utility 44 inspects the error-class field 42c and decides, on the basis of information in the error-class field 42c, whether to repair the data error.

Alternatively, the error-correction utility 44 can be programmed to repair only errors made between specified dates and times. In this case, the error-correction utility 44 inspects the time-stamp field 42b and, on the basis of information contained in the time-stamp field 42b, decides whether to repair the data error.

An error-correction utility 44 can also be programmed to repair only data errors made by a particular storage device 20(1) or data errors associated with specified logical locations on a particular storage device 20(1). In such a case, the error-correction utility 44 inspects the address field 42a and, on the basis of information in the address field 42a, decides whether to repair the data error.

Finally, an error-correction utility 44 can also be programmed to repair only errors identified by Boolean combinations of the foregoing fields. For example, the error-correction utility 44 can be instructed to repair only data errors on a particular storage device between specified dates and having specified error types.

In another embodiment, a human operator examines the contents of the scan buffer 40 to determine which of the data errors is to be repaired. In this case, the error entry 42 also includes a repair flag 42f whose value is set by the human operator. The error-correction utility 44 then repairs only those data errors designated by the repair flag 42f.

The first and second embodiments can also be integrated together by having the error-correction utility 44 follow programmed rules for repairing disk errors unless the repair flag 42f indicates that the programmed rules are to be overridden by human intervention.

Figure 6:
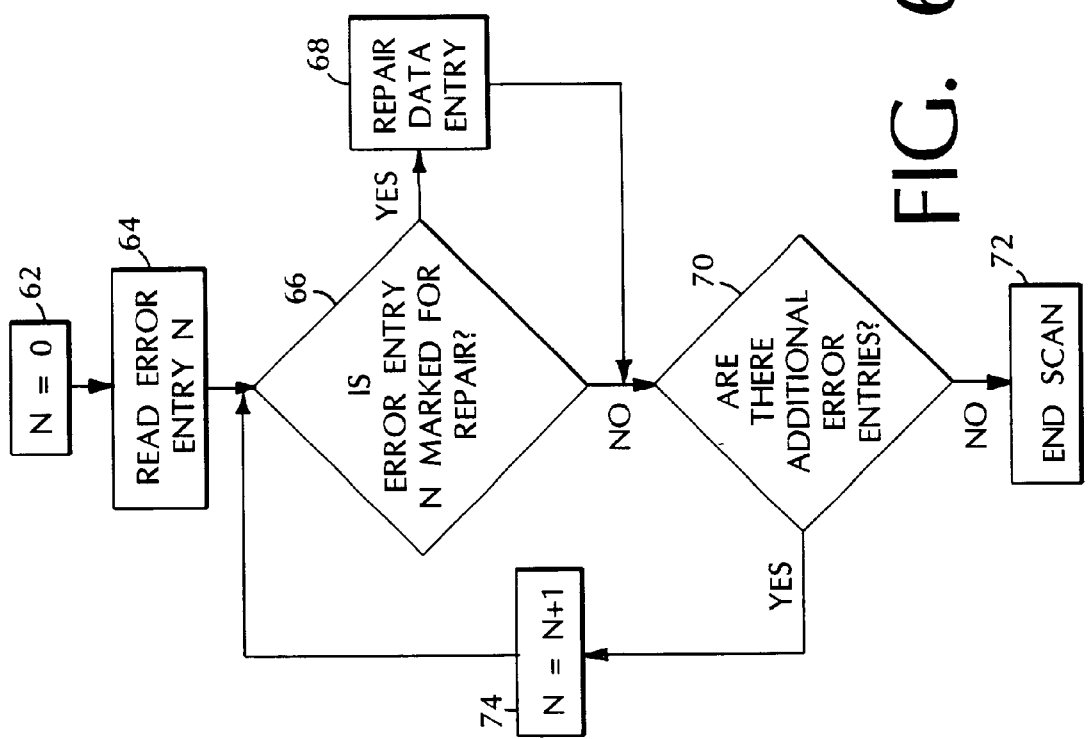
FIG. 6 is a flowchart showing the method by which error entries are used by the error-correction utility.
Figure 5:
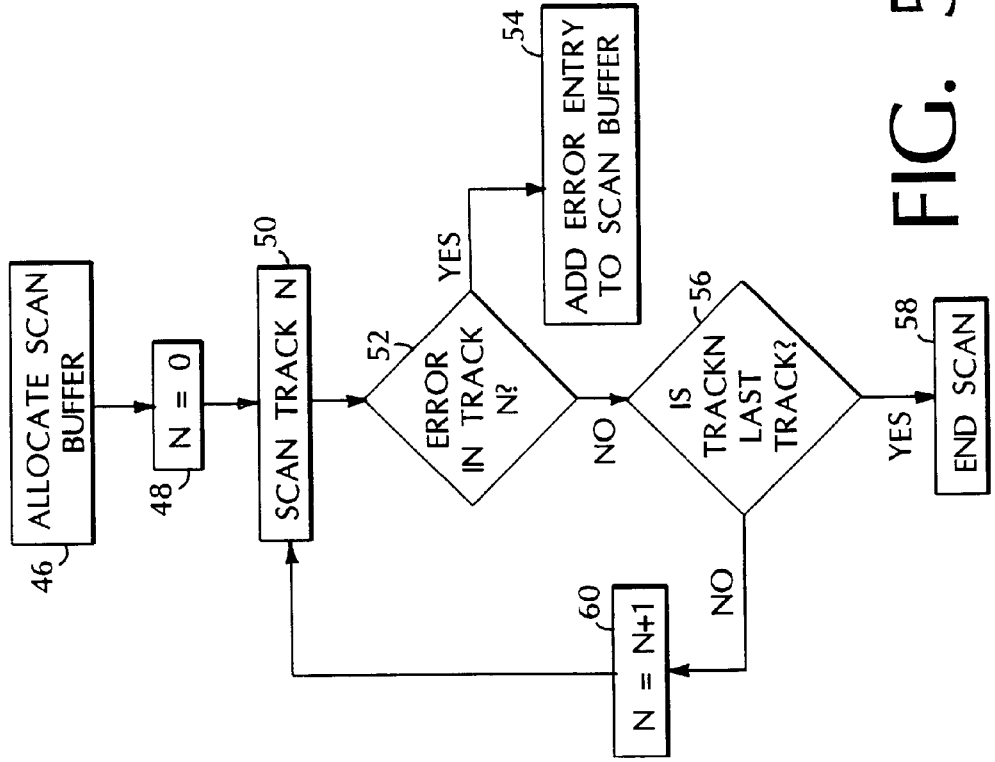
FIG. 5 is a flowchart showing the method for creating error entries in the scan buffer of FIG. 1.

FIGS. 5 and 6 summarize the scanning method and error-correction methods in a flowchart. As shown in FIG. 5, the scanning method is preceded by the allocation 46 of a scan buffer in the global memory. This step is typically executed as part of initializing the disk storage system. A counter is then initialized 48 and a track identified by that counter is scanned 50. The scanning utility then determines if a data error exists on that track 52. If a data error exists, the scanning utility creates an entry in the scan buffer with information descriptive of that error 54. Otherwise, the scanning utility checks to see if that track is the last track to be checked 56. If it is, the scanning utility ends the scan 58. Otherwise, the scanning utility increments the counter 60 and begins another iteration of the loop.

FIG. 6 shows the error-correction method that begins with the error-correction utility initializing 62 a counter and reading 64 the corresponding error entry from the scan buffer. The error-correction utility then determines 66, from information in the error entry, whether it is to repair the data error. If the error entry indicates that the data error is marked for repair, the error-correction utility repairs 68, or attempts to repair, the data error.

In either case, the error-correction utility determines 70 whether there are additional error entries in the scan buffer. If there are none, the error-correction utility terminates 72. Otherwise, the error-correction utility increments 74 the counter and proceeds to read the next error entry in the scan buffer.

The foregoing description sets forth one particular embodiment of a system that incorporates the principles of the invention. However, the invention is not limited to the specific embodiment set forth above. Instead, the scope of the invention is to be determined by the appended claims.

What we claim as new, and secured by Letters Patent is:

1. A method of scanning a mass-storage device in communication with a global memory, said method comprising
   allocating a scan buffer in said global memory;
   scanning said mass-storage device;
   during said scan of said mass-storage device, detecting a data error in said mass-storage device;
      writing, to said scan buffer, information descriptive of said data error, and
      including, as part of said information descriptive of said data error, information identifying a mass-storage device from said plurality of mass-storage devices.

2. The method of claim 1 wherein writing to said scan buffer comprises interleaving, within said scan buffer, information descriptive of data errors occurring in different mass-storage devices.

3. The method of claim 1 wherein writing information descriptive of said data error comprises writing an error code indicative of a type of data error.

4. The method of claim 1 wherein writing information descriptive of said data error comprises writing a time stamp indicative of when said data error was recorded in said buffer.

5. The method of claim 1 wherein writing information descriptive of said data error comprises writing an address code indicative of a logical location of said data error in said mass storage medium.

6. The method of claim 1 wherein writing information descriptive of said data error comprises writing a signature indicative of a scanning utility detecting said data error.

7. The method of claim 1 wherein writing information descriptive of said data error comprises writing a repair flag indicative of whether said data error is to be repaired.

8. The method of claim 1 wherein writing information descriptive of said data error comprises writing a status flag indicative of whether said data error has been repaired.

9. A method of repairing a data error in a mass storage system having a global memory in communication with at least one mass-storage device, said method comprising retrieving, from a scan buffer in said global memory, information descriptive of said data error;

implementing a pre-programmed rule for deciding, on the basis of said information descriptive of said data error, whether said data error is to be repaired; and displaying said information descriptive of said data error to a system operator; and if said data error is to be repaired, repairing said data error.

10. A data storage system comprising:

a mass-storage device;

a global memory in data communication with said mass-storage device; and a scan buffer allocated in said global memory, said scan buffer containing information descriptive of data errors in said mass-storage device, said scan buffer including an error entry corresponding to a data error on said mass-storage device.

11. The data storage system of claim 10 wherein said error entry comprises an errorclass field containing information indicative of a type of data error.

12. The data storage system of claim 10 wherein said error entry comprises a statusflag field containing information indicative of whether said data error has been repaired.

13. The data storage system of claim 10 wherein said error entry comprises a repair-flag field containing information indicative of whether said data error is to be repaired.

14. The data storage system of claim 10 wherein said error entry comprises a signature field containing information indicative of a scanning utility detecting said data error.

15. The data storage system of claim 10 wherein said error entry comprises a timestamp field containing information indicative of when said data error was recorded in said buffer.

16. The data storage system of claim 10 wherein said error entry comprises an address field containing information indicative of a logical location of said data error in said mass storage medium.

* * * * *